United States Patent
Shinozaki

(10) Patent No.: US 9,606,651 B2
(45) Date of Patent: Mar. 28, 2017

(54) ELECTRONIC DEVICE

(75) Inventor: Takayuki Shinozaki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 134 days.

(21) Appl. No.: 13/982,237

(22) PCT Filed: Jan. 26, 2012

(86) PCT No.: PCT/JP2012/000504
§ 371 (c)(1),
(2), (4) Date: Jul. 26, 2013

(87) PCT Pub. No.: WO2012/102049
PCT Pub. Date: Aug. 2, 2012

(65) Prior Publication Data
US 2013/0307807 A1    Nov. 21, 2013

(30) Foreign Application Priority Data
Jan. 27, 2011    (JP) .................................. 2011-015581

(51) Int. Cl.
*G06F 3/041* (2006.01)
*G06F 3/01* (2006.01)

(52) U.S. Cl.
CPC .............. *G06F 3/041* (2013.01); *G06F 3/016* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 2006/0152499 A1* | 7/2006 | Roberts | G06F 3/043 345/173 |
| 2009/0002328 A1* | 1/2009 | Ullrich | G06F 3/016 345/173 |
| 2009/0085878 A1* | 4/2009 | Heubel et al. | 345/173 |
| 2011/0050576 A1* | 3/2011 | Forutanpour | G06F 3/0488 345/168 |

FOREIGN PATENT DOCUMENTS

| | | |
|---|---|---|
| JP | 06-175771 A | 6/1994 |
| JP | 11-212725 A | 8/1999 |
| JP | 2000-172446 A | 6/2000 |
| JP | 2003-241898 A | 8/2003 |
| JP | 2005-275934 A | 10/2005 |

OTHER PUBLICATIONS

International Search Report; PCT/JP2012/00504; Apr. 10, 2012.
An Office Action; "Notice of Reason for Rejection," issued by the Japanese Patent Office on Apr. 1, 2014, which corresponds to Japanese Patent Application No. 2012-554697 and is related to U.S. Appl. No. 13/982,237; with English language concise explanation.

* cited by examiner

*Primary Examiner* — Joseph Haley
*Assistant Examiner* — Ifedayo Iluyomade
(74) *Attorney, Agent, or Firm* — Studebaker & Brackett PC

(57) ABSTRACT

An electronic device (1) is provided with a contact detection unit (40) that detects contact by a contacting object, a vibration unit (50) that vibrates the contact detection unit (40), and a control unit (10) that controls the vibration unit (50) to vibrate. The control unit (10), while controlling the vibration unit (50) to vibrate, determines a position of the contact based on a plurality of positions of contact detected by the contact detection unit (40) during a predetermined time.

4 Claims, 7 Drawing Sheets

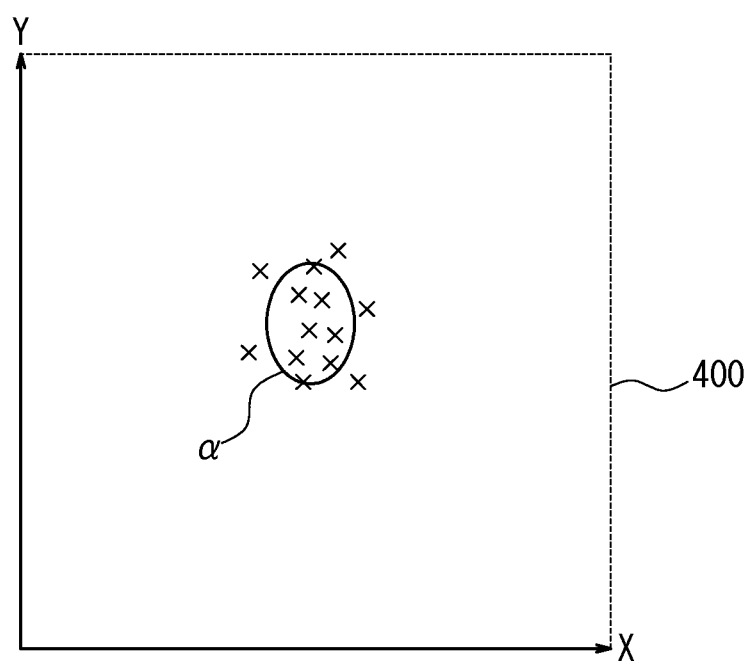

ELECTRONIC DEVICE

CROSS-REFERENCE TO RELATED APPLICATION

This application claims priority to and the benefit of Japanese Patent Application No. 2011-15581 filed Jan. 27, 2011, the entire contents of which are incorporated herein by reference.

FIELD

The present invention relates to an electronic device. Some embodiments discussed herein relate to an electronic device that executes predetermined processing, such as executing application software, based on an operation input into a contact detection unit, such as a touch sensor.

BACKGROUND

In recent years, among mobile terminals such as cellular phones, electronic devices are increasingly provided with a touch sensor, such as a touch panel or touch switch, as a member for detecting an operation by the operator. Electronic devices provided with a touch sensor are in wide use apart from mobile terminals as well, in devices such as calculators or ticket vending machines, household appliances such as microwave ovens, televisions, or lighting appliances, industrial devices (factory automation equipment), and the like.

A variety of types of such touch sensors are known, including a resistive film type, a capacitive type, and an optical type. All of these types of touch sensors detect contact by the operator's finger, a stylus pen, or the like. Typically, an electronic device provided with a touch sensor displays an image (hereinafter referred to as an "object") of an operation key, a button, or the like on the display screen of a display unit provided on the rear face of the touch sensor. In such an electronic device, when the operator presses an object displayed on the display screen, the touch sensor is configured to detect contact at the position of the press.

Conventionally, a variety of touch sensors have been proposed (for example, see Patent Literature 1). Patent Literature 1 proposes an analog resistive film type touch panel that can be produced at a low cost and with a reduced size. The touch panel disclosed in Patent Literature 1 has two conducting films with a slight gap therebetween provided by a spacer. The touch panel is configured to read the position of contact at which the conducting films are pressed as a voltage at one conducting film based on the voltage gradient on the other conducting film.

Many electronic devices provided with the above-described touch sensor execute different, predetermined processing in accordance with the position of the contact detected by the touch sensor. In other words, in the touch sensor corresponding to the object region displayed on the display unit, different processing is often allocated to each object. For example, in such an electronic device, a menu screen is displayed when contact is detected on the touch sensor at a position corresponding to a menu button object, whereas the cursor is moved when contact is detected on the touch sensor at a position corresponding to an arrow key object. When, for example, the processing to be initiated is thus distinguished in accordance with input corresponding to a plurality of objects, the accuracy with which the position of contact is detected is important when the touch sensor detects the contact. Therefore, when detecting the position of contact with a touch sensor, a technique has been proposed to accurately detect the position of contact (for example, see Patent Literature 2).

CITATION LIST

Patent Literature

PTL 1: JP2003241898A
PTL 2: JP2005275934A

In the touch panel device disclosed in Patent Literature 2, the occurrence of a voltage drop that depends on the resistance of one of two conducting films configuring the touch panel does not affect the result of detecting the contact position. In other words, the effect of a voltage drop in one of the two conducting films can be eliminated from the contact position detection result. Accordingly, the press position can be accurately identified.

With the touch panel device recited in Patent Literature 2, it is assumed that the position of contact on the touch panel is detected by contact with a pointer member such as a stylus pen. In the touch panel devices provided in mobile terminals that have become popular in recent years, however, it is often assumed that the operator provides operation input directly with a finger, without using a stylus pen or the like. If the operator uses a finger to provide a touch sensor with operation input, the position of contact detected by the touch sensor has a certain area, unlike when using a tapered member such as a stylus pen. When the touch sensor is thus contacted over a relatively large area or is contacted simultaneously at two or more positions, the two conducting films are connected over a larger section or at multiple locations.

When the location contacted on the touch sensor has a certain area, the contact position detected by the touch sensor becomes one of the positions within the contacted section. The detected contact position therefore varies within a predetermined area. As a result, the distribution of resistance in the conducting films becomes locally uneven, lowering the accuracy of detection of the contact position by the touch sensor.

SUMMARY

An electronic device according to a first aspect of the present invention for achieving the above object includes: a contact detection unit configured to detect contact by a contacting object; a vibration unit configured to vibrate the contact detection unit; and a control unit configured to control the vibration unit to vibrate, such that the control unit, while controlling the vibration unit to vibrate, determines a position of the contact based on a plurality of positions of contact detected by the contact detection unit during a predetermined time.

A second aspect of the present invention is the electronic device of the first aspect, such that the control unit sets the predetermined time in accordance with data based on pressure on the contact detection unit.

A third aspect of the present invention is the electronic device of the first aspect or the second aspect, such that the control unit calculates the position of the contact based on an average of coordinate components of the plurality of positions of contact.

According to the present invention, in an electronic device provided with a contact detection unit, the contact detection unit can accurately detect the contact position even when vibration is generated in the contact detection unit.

BRIEF DESCRIPTION OF DRAWINGS

The present invention will be further described below with reference to the accompanying drawings, wherein:

FIG. 6 illustrates contact positions detected by a touch sensor; and

DESCRIPTION OF EMBODIMENTS

The following describes the state of a touch sensor when detecting contact by the operator. FIG. 6 is a planar schematic view from the front of a touch sensor 400 in a touch panel device. As illustrated in FIG. 6, a virtual xy coordinate system is defined in the touch sensor 400 for position detection.

Under these conditions, if the operator contacts the surface of the touch sensor 400 with his own finger, the portion of the operator's finger that contacts the touch sensor 400 has area, as indicated by a in the figure. When the contacted location has area as in this case, the contact position detected by the touch sensor 400 varies over a certain area as illustrated by the x's in the figure. If such a touch sensor is used to detect the contact position, the contact position is also detected at locations slightly off from (outside of) the area α that was actually contacted, as illustrated in the figure. In other words, the variation in contact position is even observed at locations on the touch sensor 400 not actually contacted by the operator. One reason is that the area of the section in which the conducting films of the touch sensor 400 contact each other is slightly larger than the area of the touch sensor 400 contacted by the operator's finger. This phenomenon is further described below.

Figure 7A:
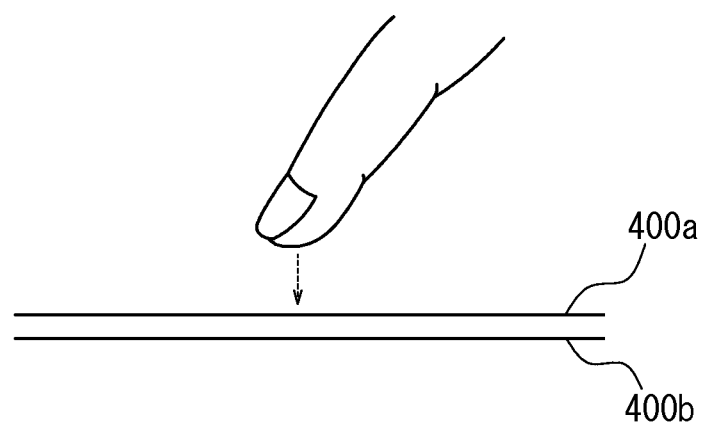
FIGS. 7A and 7B illustrate the state of a touch sensor when contact is detected.
Figure 7B:
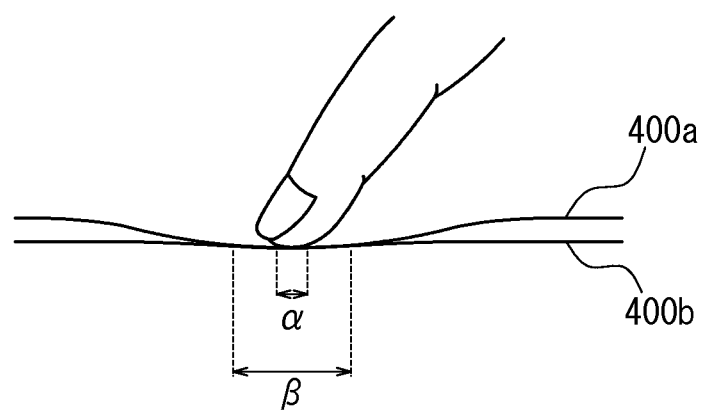

FIGS. 7A and 7B are cross-sectional diagrams of portions of the touch sensor 400 in the touch panel device described in FIG. 6. As illustrated in FIG. 7A, the touch sensor 400 is composed of an upper conducting film 400a and a lower conducting film 400b. When the operator presses the upper conducting film 400a with a finger from above, the upper conducting film 400a bends as illustrated in FIG. 7B so as to contact the lower conducting film 400b. Although the operator's finger only contacts the conducting film 400a in a section with area α, the conducting film 400a around the area α simultaneously bends, as illustrated in the figure, so that an area β of contact between the upper conducting film 400a and the lower conducting film 400b is larger than the area α. Accordingly, the position of contact detected by the touch sensor 400 in this case is any position within the area β, resulting in the position of contact varying within the area β.

Such variation in the position of contact leads to the problem that when the operator intends to contact the touch sensor at a position corresponding to a predetermined object, contact may be detected at a position other than the object. If the operator presses the touch sensor with a strong pressing force, this variation in the contact position becomes even more noticeable, since the contact area of the conducting films increases.

Also of note is that when a contact operation is performed on a touch sensor, the operator does not obtain any feedback for the operation, since the touch sensor is not physically displaced like a push button switch. Therefore, terminals sold recently adopt a feedback method to produce a vibration at the operator's fingertip by vibrating the touch sensor when the touch sensor detects contact. According to such a terminal, the operator performing a contact operation can confirm, via a tactile sensation, that the terminal properly recognized the operation on the touch sensor.

Generating vibration while the touch sensor is detecting contact by the operator, however, is exactly the same as vibrating the sensor that detects contact by the operator. If vibration is generated while the touch sensor is detecting contact by the operator, the touch sensor itself of course moves, as does the operator's finger that is in contact with the touch sensor. Furthermore, the state of contact between the two conducting films as described in FIG. 7 also changes slightly. As a result, the position of contact detected by the touch sensor varies even more while the touch sensor is vibrating. Accordingly, from the perspective of accurate detection of the contact position as described above, vibrating the touch sensor during detection of contact in this way makes accurate detection of the contact position increasingly difficult.

The present invention has been conceived in light of these circumstances and to provide an electronic device that includes a mechanism for generating vibration in a contact detection unit and in which the contact detection unit can accurately detect the contact position even when vibration is generated in the contact detection unit.

Embodiment 1

The following describes Embodiment 1 of the present invention with reference to the drawings.

Figure 1:
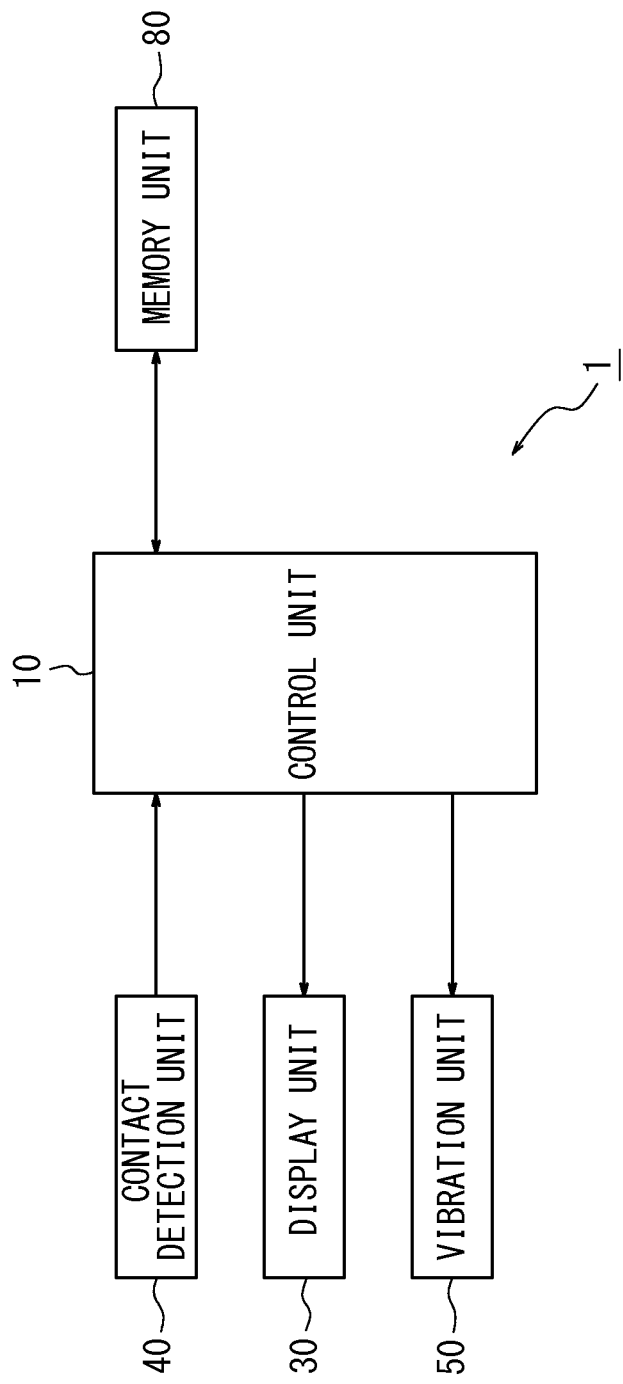
FIG. 1 is a functional block diagram schematically illustrating the configuration of an electronic device according to Embodiment 1 of the present invention.

FIG. 1 is a block diagram schematically illustrating the configuration of an electronic device according to Embodiment 1 of the present invention.

As illustrated in FIG. 1, an electronic device 1 according to Embodiment 1 is provided with a control unit 10, a display unit 30, a contact detection unit 40, a vibration unit 50, and a memory unit 80.

The control unit 10 controls and manages the entire electronic device 1 by controlling the functional units constituting the electronic device 1. Among the processing by the control unit 10, the processing particular to the present embodiment is described below.

The display unit 30 displays objects, such as a push button switch (push-type button switch), as images. These objects are images serving to suggest, to the operator, regions on the touch face of the contact detection unit 40 to be contacted. A push button switch is a button, key, or the like with which the operator performs an input operation (hereinafter collectively referred to as a "key or the like"). The display unit 30 is, for example, configured using a liquid crystal display panel (LCD), an organic EL display panel, or the like.

The contact detection unit 40 is normally provided on the front face of the display unit 30 and detects, on a corresponding touch face of the contact detection unit 40, contact by the operator's finger, a stylus pen, or the like (hereinafter collectively referred to as a "contacting object") with an object displayed on the display unit 30. The contact detection unit 40 also detects the position of the contact by the contacting object on the touch face and notifies the control unit 10 of the detected position of the contact. The contact detection unit 40 can, for example, be configured using a touch sensor that is a resistive film type, a capacitive type, an optical type or the like.

The vibration unit 50 is, for example, configured using a piezoelectric element and vibrates the contact detection unit 40. By generating vibration in a predetermined vibration pattern, the vibration unit 50 provides a tactile sensation to the contacting object that is contacting the touch face. In the present embodiment, the vibration unit 50 generates vibration based on a drive signal provided by the control unit 10. In other words, in the present embodiment, the control unit 10 controls the vibration unit 50 to vibrate. When doing so, the control unit 10 can also vary the drive signal that drives the vibration unit 50 in accordance with the position of the contact by the contacting object as detected by the contact detection unit 40. The control unit 10 can thus cause different types of vibration to be generated in accordance with the object, displayed on the display unit 30, that corresponds to the position of the contact detected by the contact detection unit 40.

The memory unit 80 is, for example, configured using NAND-type flash memory or the like and stores not only various application software (hereinafter simply referred to as an "application") executed on the electronic device 1 but also stores a variety of information. In particular, in the present embodiment, at any time the memory unit 80 can store the position of the contact detected by the contact detection unit 40.

Next, processing when the electronic device 1 according to the present embodiment detects a contact operation by the operator is described.

Figure 2:
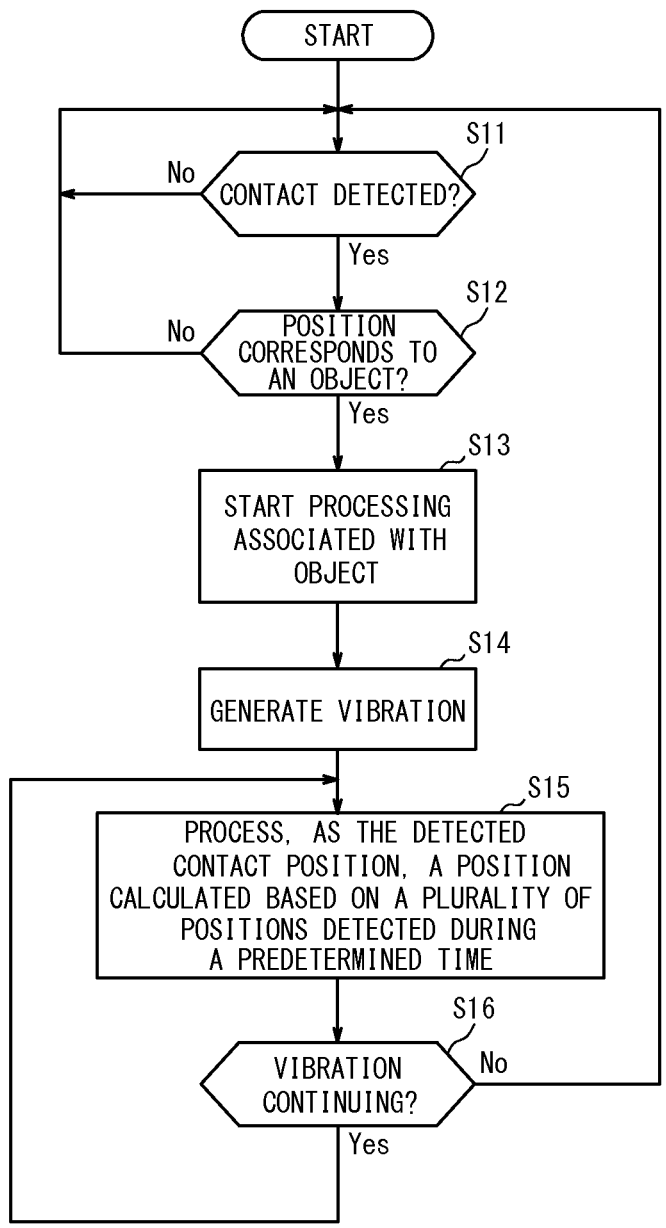
FIG. 2 is a flowchart illustrating processing by the electronic device according to Embodiment 1 of the present invention.

FIG. 2 is a flowchart illustrating processing by the electronic device 1 according to Embodiment 1. In the present embodiment, while the vibration unit 50 is vibrating, the electronic device 1 processes a position calculated based on a plurality of positions of contact detected by the contact detection unit 40 as the position of contact currently detected by the contact detection unit 40.

The following describes the above processing in detail. At the start of the processing in the present embodiment, it is assumed that the electronic device 1 displays at least one object, such as a key or icon, associated with predetermined processing, such as the start of an application, on the display unit 30 in advance.

When the processing in the present embodiment starts, the control unit 10 of the electronic device 1 determines whether the contact detection unit 40 has detected contact by a contacting object, such as the operator's finger or a stylus (step S11). When contact by a contacting object is detected in step S11, the control unit 10 determines whether the position of the contact is a position corresponding to a predetermined object displayed on the display unit 30 (step S12).

When the position of the contact in step S12 is a position corresponding to an object, the control unit 10 starts processing associated with the object corresponding to the position at which the contact was detected (step S13). If, for example, contact is detected at a position corresponding to an icon (object) that launches a music player application, the "processing associated with the object" refers to launching the music player application associated with the icon. As another example, if the contact is detected at a position corresponding to a key object for character input in character input mode or the like, the character associated with the object may be displayed on the display unit 30.

When processing associated with the object starts in step S13, the control unit 10 controls the vibration unit 50 to generate vibration (step S14). The control unit 10 may vary the type of vibration generated in step S14 in accordance with the object corresponding to the position at which contact is detected, or in accordance with the processing that starts based on detection of contact.

When vibration is generated in step S14, the control unit 10 executes the processing of step S15. In step S15, the control unit 10 executes control to use, as the position of contact detected by the contact detection unit 40, a position calculated based on a plurality of positions of contact detected by the contact detection unit 40 during a predetermined time. The control unit 10, for example, can execute processing such as substituting the calculated position for the position of the contact detected by the contact detection unit 40. Here, when calculating the position based on a plurality of positions of contact detected by the contact detection unit 40, the control unit 10 may execute control for processing to calculate the average of the detected plurality of positions of contact. In other words, for example when the detected plurality of positions of contact are represented by respective coordinate components in a plane, the control unit 10 may calculate the average of each component in any two nonparallel directions.

Furthermore, the "predetermined time" in the processing in step S15 is preferably a period determined in advance as the time for detecting a plurality of positions of contact, i.e. for sampling, yet may also be a time set in step S15, for example. Here, if the "predetermined time" is set to be too long of a period, the sampling of the plurality of contact positions takes time, resulting in a longer time until a position is calculated based on these contact positions. However, it should be noted that if the "predetermined time" is set to be short, decreasing the sampling frequency (using a rougher sampling interval) does not increase accuracy of the calculated average. Therefore, the "predetermined time" is preferably set not to be too long of a period, for example 0.5 seconds, and furthermore the sampling interval is preferably set to be relatively short (small), such as a 0.05 second interval.

After the processing in step S15, the control unit 10 determines whether the generated vibration is still continuing (step S16). In step S16, when the vibration has already stopped, the control unit 10 returns to step S11 and continues processing, since the detected position of contact will not vary due to vibration. On the other hand, when vibration is still continuing in step S16, the control unit 10 continues the processing in step S15 for as long as the vibration generated by the vibration unit 50 continues.

Accordingly, in the present embodiment, while controlling the vibration unit 50 to vibrate, the control unit 10 executes control for processing to determine a position of contact based on a plurality of positions of contact detected by the contact detection unit 40 during a predetermined time. Here, the control unit 10 preferably executes control to calculate the above-described position of the contact based on, for example, the average of coordinate components of the plurality of positions of contact detected by the contact detection unit 40 in the predetermined time.

By executing this processing, the electronic device 1 of the present embodiment uses the position calculated based on the average of a plurality of detected contact positions as the position detected by the contact detection unit 40 while the vibration unit 50 is generating vibration. Therefore, according to the present embodiment, accuracy of detection of the contact position by the contact detection unit 40 can be increased even while vibration is being generated. In other words, according to the present embodiment, even if the position at which the operator contacts the contact detection unit 40 fluctuates due to the generated vibration, the position for the average of the coordinates of the fluctuating contact position is processed as the position of the contact, thereby reducing the fluctuation of the contact position.

Embodiment 2

Next, an electronic device according to Embodiment 2 of the present invention is described.

In Embodiment 2, the above-described electronic device 1 according to Embodiment 1 is further provided with a pressure detection unit that detects pressure on the contact detection unit 40, and processing by the control unit 10 is modified. For example, in accordance with data based on pressure on the contact detection unit 40, an electronic device 2 according to Embodiment 2 adjusts the time for sampling the plurality of positions of contact in the electronic device 1 according to Embodiment 1. Other than the above points, the electronic device 2 according to Embodiment 2 can be achieved with basically the same device configuration and control as the electronic device 1 described in Embodiment 1 above. Therefore, a description of the same content as described in Embodiment 1 is omitted below as appropriate.

Figure 3:
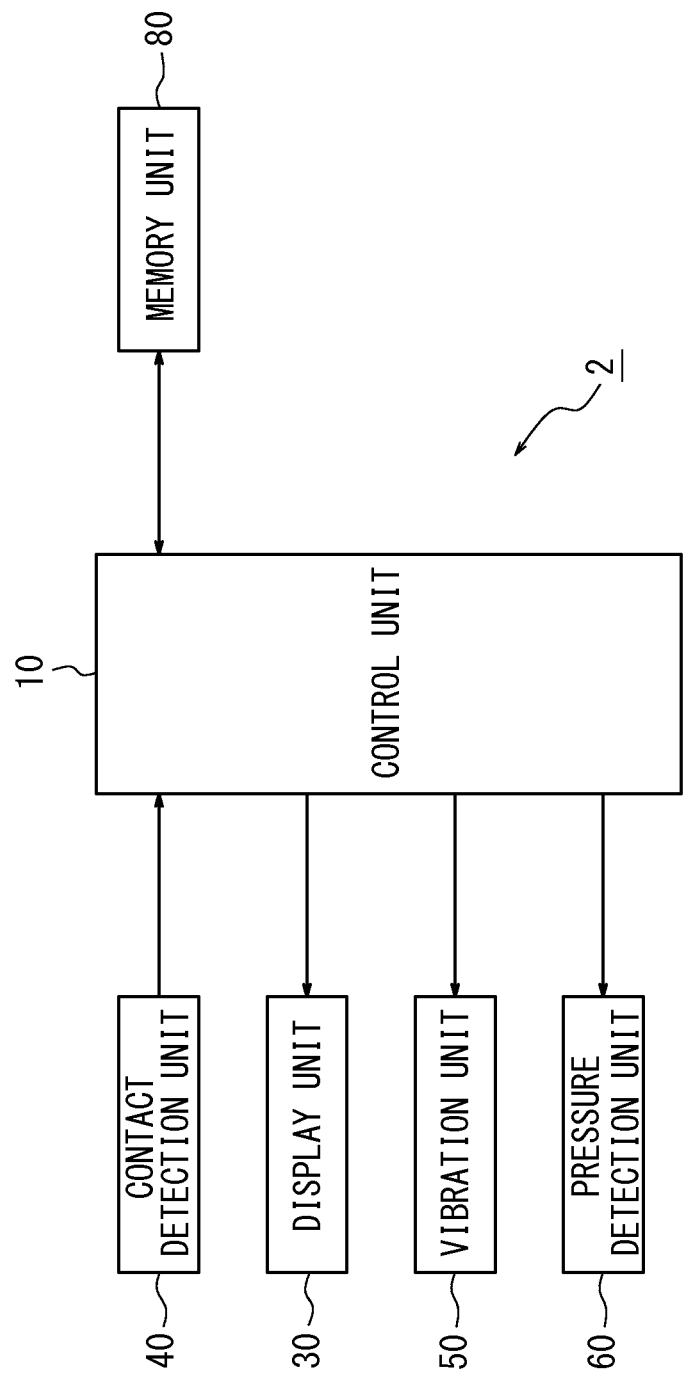
FIG. 3 is a functional block diagram schematically illustrating the configuration of an electronic device according to Embodiment 2 of the present invention.

FIG. 3 is a block diagram schematically illustrating the configuration of an electronic device according to Embodiment 2 of the present invention.

As illustrated in FIG. 3, the electronic device 2 according to Embodiment 2 is provided with a control unit 10, a display unit 30, a contact detection unit 40, a vibration unit 50, and a memory unit 80, like the above-described electronic device 1 according to Embodiment 1. Among the processing by the control unit 10, the processing particular to the present embodiment is described below. The electronic device 2 according to Embodiment 2 is further provided with a pressure detection unit 60.

The pressure detection unit 60 detects pressure on the touch face of the contact detection unit 40 and is, for example, configured using a strain gauge sensor, an element such as a piezoelectric element, or the like that experiences a change in physical or electrical characteristics (strain, resistance, voltage, or the like) in response to pressure. When the pressure detection unit 60 is configured using a piezoelectric element, for example, the magnitude of the voltage (voltage value), which is an electrical characteristic, of the piezoelectric element changes in accordance with the magnitude of the load (force) of the pressure on the touch face of the contact detection unit 40 (or the speed at which the magnitude of the load (force) changes (acceleration)). The pressure detection unit 60 notifies the control unit 10 of the magnitude of the voltage (voltage value, hereinafter referred to as simply data). The control unit 10 acquires the data by the pressure detection unit 60 notifying the control unit 10 of the data, or by the control unit 10 detecting data relating to the piezoelectric element of the pressure detection unit 60. The control unit 10 thus acquires data based on pressure on the touch face of the contact detection unit 40. In other words, the control unit 10 acquires data based on pressure from the pressure detection unit 60.

Figure 4A:
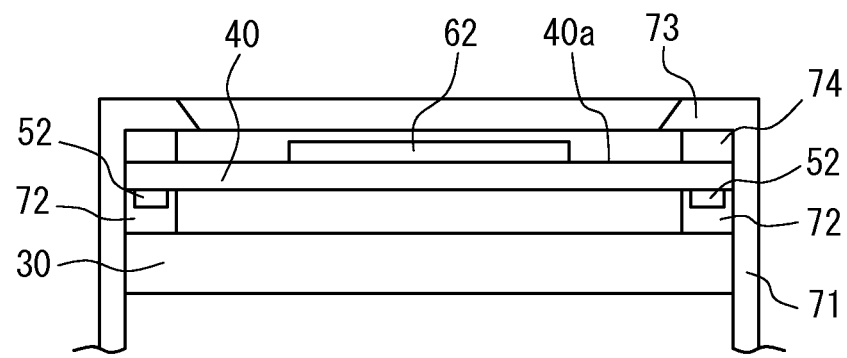
FIGS. 4A and 4B illustrate an exemplary housing structure of the electronic device according to Embodiment 2 of the present invention.
Figure 4B:
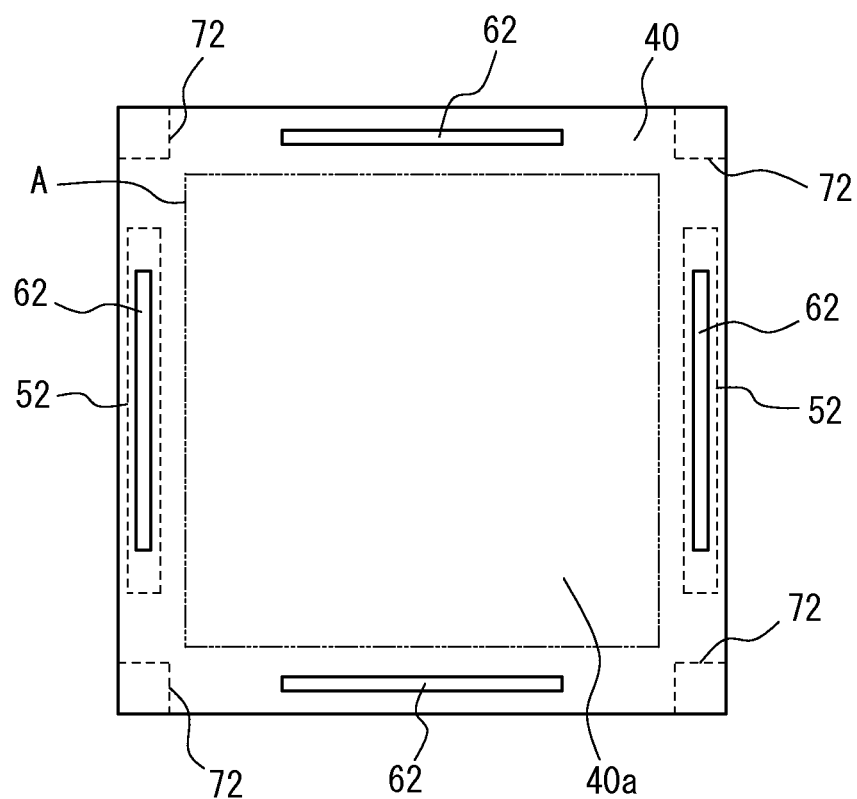

FIGS. 4A and 4B illustrate an exemplary housing structure focusing on the display unit 30, contact detection unit 40, vibration unit 50, and pressure detection unit 60 of the electronic device 2 illustrated in FIG. 3. FIG. 4A is a cross-sectional diagram of some portions, and FIG. 4B is a plan view of some portions. As illustrated in FIG. 4A, in the electronic device 2 according to the present embodiment, the display unit 30 is contained in a housing 71. The contact detection unit 40 is held on the display unit 30 via insulators 72 made of elastic members. In the electronic device 2, the contact detection unit 40 is held on the display unit 30 via the insulators 72 arranged at four corners outside a display area A of the display unit 30 illustrated by a phantom line in FIG. 4B. Note that in FIG. 4, the display unit 30 and the contact detection unit 40 in the electronic device 2 according to the present embodiment are shown as rectangles in plan view. The shape of the contact detection unit 40 and the display unit 30 provided in the electronic device 2 may, however, conform to conditions such as the configuration of these units.

The housing 71 is provided with an upper cover 73 covering a surface area of the contact detection unit 40 outside the display area of the display unit 30, and an insulator 74 made from an elastic member is provided between the upper cover 73 and the contact detection unit 40. The contact detection unit 40 illustrated in FIG. 4 has a surface member, configured for example using a transparent film or glass, and a rear face member configured using glass or acryl. The surface member includes a touch face 40a. The contact detection unit 40 is structured so that when the touch face 40a is pressed, the pressed part bends (strains) slightly in response to the pressing force, or the entire structure bends slightly.

Strain gauge sensors 62 for detecting pressure on the contact detection unit 40 are provided, by attachment or the like, on the surface of the contact detection unit 40 near each side thereof at a position covered by the upper cover 73. Furthermore, piezoelectric elements 52 for vibrating the contact detection unit 40 are provided, by attachment or the like, on the rear face of the contact detection unit near two opposing sides thereof. In other words, in the electronic device 2 illustrated in FIG. 4, the pressure detection unit 60 illustrated in FIG. 3 is configured using four strain gauge sensors 62, and the vibration unit 50 is configured using two piezoelectric elements 52. The vibration unit 50 vibrates the contact detection unit 40 in order to cause the touch face 40a to vibrate. Note that in FIG. 4B, the housing 71, upper cover 73, and insulator 74 illustrated in FIG. 4A are omitted.

Figure 5:
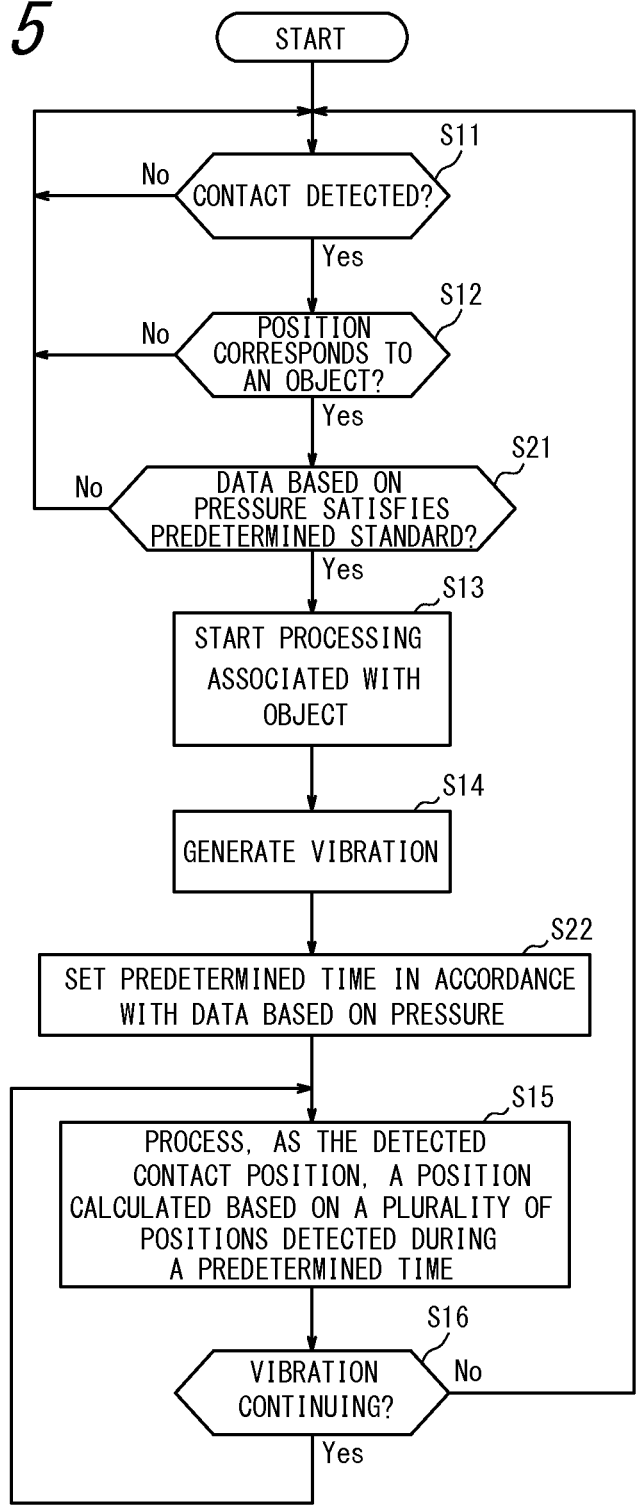
FIG. 5 is a flowchart illustrating processing by the electronic device according to Embodiment 2 of the present invention.

FIG. 5 is a flowchart illustrating processing by the electronic device 2 according to Embodiment 2.

When the processing in the present embodiment starts, and the contact detection unit 40 detects contact in step S11, the control unit 10 determines in step S12 whether the position of the contact is a position corresponding to an object, as in Embodiment 1.

In the present embodiment, when the position of the contact in step S12 is a position corresponding to an object, the control unit 10 determines whether the data based on the pressure acquired from the pressure detection unit 60 satisfies a predetermined standard while increasing due to pressure on the contact detection unit 40 (step S21). The control unit 10 for example treats the average of data from the four strain gauge sensors 62 as the data based on pressure on the touch face of the contact detection unit 40. For the data satisfying a predetermined standard, a value such as 1 V is set in advance based on the load (force) of the pressure when the operator performs a normal press operation, and the value is preferably allowed to be reset afterwards. Furthermore, so that an operation is not accepted as input when the operator unintentionally touches the device lightly, and so as to provide the operator with a sense of pressure in order to present a real tactile sensation, this predetermined standard is set not to be excessively low by taking into consideration the load (force) of the pressure when the operator intentionally performs a press operation (by using, for example, an average value).

When the data based on pressure in step S21 does not satisfy the predetermined standard, the control unit 10 returns to step S11 and continues processing. On the other hand, when the data based on pressure in step S21 satisfies the predetermined standard, the control unit 10 starts processing associated with the object corresponding to the position at which the contact was detected in step S13 and, in step S14, controls the vibration unit 50 to generate vibration.

When vibration is generated in step S14, the control unit 10 sets the time (predetermined time) for sampling the plurality of positions of contact in accordance with the data based on the pressure acquired from the pressure detection unit 60 (step S22). The control unit 10 can, for example, adopt a configuration to lengthen the above predetermined time as the data based on the pressure acquired from the pressure detection unit 60 is larger. The reason is that, as described above, if the operator presses the contact detection unit 40 with a strong pressing force, the variation in the contact position detected by the contact detection unit 40 increases, since the contact area of the conducting films increases. In such a case, the variation in the contact position detected by the contact detection unit 40 can be averaged out by setting the predetermined time to be longer.

Once the predetermined time is set in step S22, the control unit 10 executes control in step S15 to use, as the position of contact detected by the contact detection unit 40, a position calculated based on a plurality of positions of contact detected by the contact detection unit 40 during the predetermined time. After the processing in step S15, the control unit 10 determines in step S16 whether the generated vibration is still continuing. Subsequent processing is the same as described above in Embodiment 1, and therefore a detailed explanation is omitted.

Accordingly, in the present embodiment, while controlling the vibration unit 50 to vibrate, the control unit 10 executes control for processing to determine a position of contact based on a plurality of positions of contact detected by the contact detection unit 40 during a predetermined time. Here, the control unit 10 preferably executes control to calculate the above-described position of the contact based on, for example, the average of coordinate components of the plurality of positions of contact detected by the contact detection unit 40 in the predetermined time. Furthermore, the control unit 10 preferably executes control for processing to set the above-described predetermined time in accordance with data based on the pressure acquired from the pressure detection unit 60.

In other words, while controlling the vibration unit 50 to vibrate, the control unit 10 executes control to determine a position of contact based on a plurality of positions of contact detected by the contact detection unit 40 during a predetermined time, as in Embodiment 1. In Embodiment 2, the control unit 10 executes control to set the predetermined time in accordance with data based on the pressure acquired from the pressure detection unit 60.

By executing this processing, the electronic device 2 of the present embodiment achieves the same effects as the electronic device 1 described in Embodiment 1. Furthermore, in the electronic device 2 of the present embodiment, the control unit 10 adjusts the time for sampling the plurality of positions of contact in accordance with data based on the pressure on the contact detection unit 40. Hence, according to the present embodiment, the accuracy of detection of the contact position by the contact detection unit 40 may be improved, since the number of samples of the plurality of positions of contact is appropriately adjusted in accordance with the pressing force when the operator operates the contact detection unit 40. In other words, according to the present embodiment, even if the position at which the operator contacts the contact detection unit 40 fluctuates due to the generated vibration, the position for the average of the coordinates of the fluctuating contact position is processed as the position of the contact while taking into account the conditions of operation by the operator, thereby reducing the fluctuation of the contact position.

Note that the present invention is not limited to the above embodiments, and a variety of modifications and changes are possible. For example, in the above embodiments, an object is displayed on the display unit 30, and the contact detection unit 40 detects contact by the operator. The present invention is not, however, limited to this configuration. For example, a configuration may be envisioned in which instead of providing a display unit 30, objects are printed directly with ink or the like on the touch face of the contact detection unit 40.

Furthermore, when calculating the average of the coordinates of the fluctuating contact position in step 15 of the above embodiments, if a position that greatly deviates from a predetermined range is detected among the detected plurality of positions of contact, this position may be considered to be noise and thus excluded from calculation of the average.

Furthermore, an electronic device according to the present invention is not limited to the configuration described in the above embodiments, and a variety of configurations may be adopted in accordance with design requirements. For example, in the above embodiments, the memory unit 80 is described as a separate component. Alternatively, a configuration may be adopted wherein the control unit 10, for example, includes the functions of the memory unit 80 in its own cache memory.

In the above embodiments, after starting processing associated with an object in step S13, vibration is generated in step S14. The order of this processing, however, may be reversed, so that processing associated with an object is started after generating vibration. Furthermore, in Embodiment 2, as long as the setting of the predetermined time in step S22 precedes step S15, the order of processing may be changed with some degree of freedom.

In the above embodiments, while the vibration unit 50 is controlled to vibrate, a position of contact is determined based on a plurality of positions of contact detected by the contact detection unit 40 during a predetermined time. In the present invention, however, a position of contact may be determined based on a plurality of positions of contact detected by the contact detection unit 40 even while the vibration unit 50 is not vibrating. In this case, in order to determine the position of contact, the number of samples for detecting a plurality of positions of contact (i.e. sampling) is, for example, preferably greater when the vibration unit 50 is vibrating than when the vibration unit 50 is not vibrating. Specifically, if the predetermined time for sampling is the same regardless of vibration, for example, the sampling frequency is increased during vibration (i.e. the sampling interval is reduced). Furthermore, if the sampling frequency is the same regardless of vibration, for example, the sampling interval is lengthened during vibration.

In the above embodiments, the contact detection unit 40 is used to detect contact on the touch face of the contact detection unit, but alternatively the pressure detection unit 60 may be used to determine that contact has been made when a predetermined standard is satisfied. Such a pressure detection unit 60 can be configured by providing the contact detection unit 40 with any number of strain gauge sensors or the like, as described with reference to FIG. 4.

Furthermore, the pressure detection unit 60 can be configured in accordance with the contact detection type of the contact detection unit 40. For example, in the case of a resistive film type, a configuration without a strain gauge sensor may be adopted by associating the magnitude of the resistance that corresponds to the size of the contact area with the load (force) of the pressure on the touch face of the contact detection unit 40. Alternatively, in the case of a capacitive type, a configuration without a strain gauge sensor may be adopted by associating the magnitude of the capacitance with the load (force) of the pressure on the touch face of the contact detection unit 40.

The vibration unit 50 may also be configured using any number of piezoelectric elements, by providing a transparent piezoelectric element along the entire surface of the contact detection unit 40, or by rotating an eccentric motor once per cycle of a drive signal. Furthermore, when the pressure detection unit 60 and the vibration unit 50 are both configured using a piezoelectric element, these units may be combined into a pressure detection and vibration unit that share a common piezoelectric element. The reason is that a piezoelectric element generates an electric charge when pressure is applied and deforms upon application of an electric charge.

Furthermore, as described above, when the magnitude of voltage (voltage value (data)) of a piezoelectric element doubling as the pressure detection unit 60 satisfies a predetermined standard, the vibration unit 50 may generate vibration by driving the piezoelectric element. Here, the magnitude of voltage (voltage value (data)) of the piezoelectric element satisfying a predetermined standard may refer to the voltage value (data) reaching a predetermined standard value, to the voltage value (data) exceeding a predetermined standard value, or to detection of a voltage value (data) equivalent to a predetermined standard value.

In the above embodiments, a configuration is assumed in which the contact detection unit 40 is layered on the upper surface of the display unit 30. This configuration is not essential to an electronic device according to the present invention, however, and a configuration may be adopted in which the contact detection unit 40 and display unit 30 are separated. A configuration in which the contact detection unit 40 is layered on the display unit 30, however, makes it easier for the operator to recognize the relationship between the displayed image and the generated vibration (as well as the predetermined processing that starts).

Furthermore, the display unit 30 and contact detection unit 40 in the above embodiments may be configured as an integrated device, for example by providing a common substrate with the functions of both a display unit and a contact detection unit. An example of such a device integrating the functions of both a display unit and a contact detection unit may be a liquid crystal panel having a matrix of pixel electrodes, with a plurality of photoelectric conversion elements, such as photodiodes, regularly mixed therein. Such a device may be contacted by a pen for touch input at a desired position on the panel display, and while displaying images with the liquid crystal panel structure, the device can detect the contact position by light from a backlight for liquid crystal display being reflected by the tip of the pen and received by surrounding photoelectric conversion elements.

The vibration unit 50 may be configured to vibrate the contact detection unit 40 indirectly by causing the electronic device 1 to vibrate via a vibration motor (eccentric motor) or the like, or to vibrate the contact detection unit 40 directly by arranging a piezoelectric element or the like on the contact detection unit 40.

In the above embodiments, while controlling the vibration unit 50 to vibrate, the control unit 10 executes control to calculate a position of contact based on the average of coordinate components of the plurality of positions of contact detected by the contact detection unit 40 in the predetermined time. In the present invention, however, calculation of the position of contact is not limited to this method. Alternatively, the control unit 10 may weight the coordinate components of the plurality of positions of contact detected by the contact detection unit 40 in the predetermined time and calculate the position of contact based on the average of the weighted coordinate components. In this case, among the plurality of positions of contact detected by the contact detection unit 40 in the predetermined time, for example, a small weight may be assigned to a position with an older detection time, and the weight may then increase progressively for a newer detection time. When calculating the position of the contact, the control unit 10 may also use the coordinate components of all positions of contact detected by the contact detection unit 40 in the predetermined time, or only a portion of the coordinate components of the detected positions of contact. Furthermore, a variety of methods of calculating the position of contact may be adopted, as long as the methods calculate the position of contact based on the coordinate components of the plurality of positions of contact detected by the contact detection unit 40 in the predetermined time.

REFERENCE SIGNS LIST

1, 2: Electronic device
10: Control unit
30: Display unit
40: Contact detection unit
50: Vibration unit
60: Pressure detection unit
80: Memory unit

The invention claimed is:

1. An electronic device comprising:
a contact detector configured to detect contact by a single contacting object;
a vibrator configured to vibrate the contact detector; and
a processor configured to control the vibrator to vibrate, wherein
the processor controls the vibrator to vibrate when the contact to a predetermined position by the single contacting object is detected and a pressure load by the single contacting object increases to reach a predetermined standard, and, while controlling the vibrator to vibrate, determines, as a position of the contact of the single contacting object, a position determined based on a plurality of positions of contact of the single contacting object detected by the contact detector during a predetermined time.

2. The electronic device according to claim 1, wherein the processor sets the predetermined time in accordance with data based on pressure on the contact detector.

3. The electronic device according to claim 1, wherein the processor calculates the position of the contact based on an average of coordinate components of the plurality of positions of contact of the single contacting object.

4. The electronic device according to claim 2, wherein the processor calculates the position of the contact of the single contacting object based on an average of coordinate components of the plurality of positions of contact of the single contacting object.

* * * * *